(No Model.)
A. INSINGER.
MACHINE FOR WINDING SPOOLS, &c.
No. 384,446. Patented June 12, 1888.
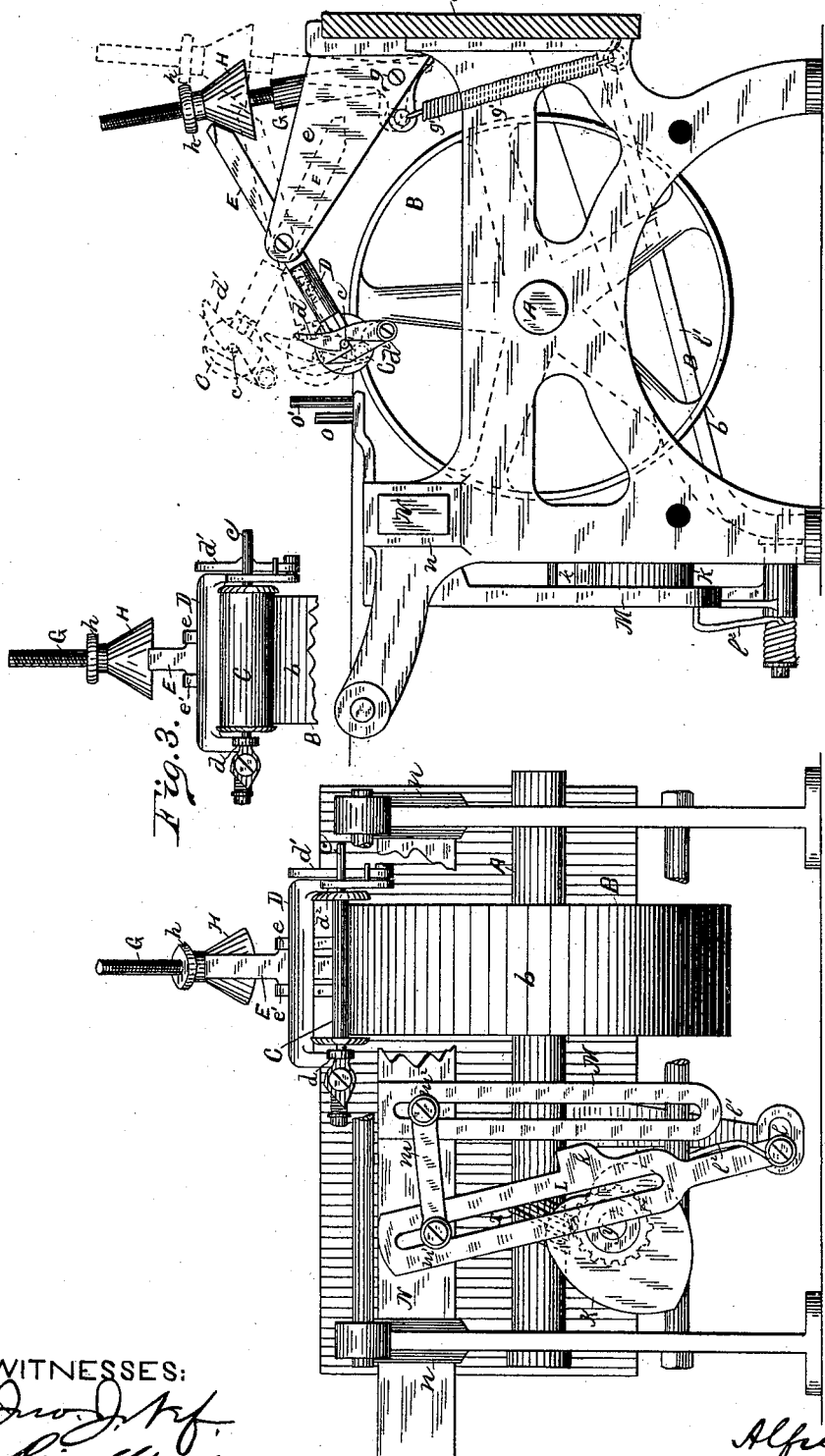
WITNESSES:
INVENTOR.

UNITED STATES PATENT OFFICE.

ALFRED INSINGER, OF PHILADELPHIA, PENNSYLVANIA, ASSIGNOR TO WILLIAM P. UHLINGER, OF SAME PLACE.

MACHINE FOR WINDING SPOOLS, &c.

SPECIFICATION forming part of Letters Patent No. 384,446, dated June 12, 1888.

Application filed December 27, 1887. Serial No. 258,959. (No model.)

*To all whom it may concern:*

Be it known that I, ALFRED INSINGER, a citizen of the United States, residing in the city and county of Philadelphia, and State of Pennsylvania, have invented a new and useful Improvement in Machines for Winding Spools, &c., of which the following is a true and exact description, due reference being had to the drawings which accompany and form part of this specification.

My invention relates more specifically to an improvement in mechanism whereby the spool or quill is thrown out of operation when the desired amount of cotton, silk, or other material is wound upon the spool or quill. In the devices heretofore in use for accomplishing this the operation has been uncertain, the mechanism somewhat complicated, and the mechanism could not be adjusted to release the spool or quill with accuracy and certainty when any desired amount was wound upon it. By my invention I am enabled to accomplish the desired result with certainty, simplicity of mechanism, and to cause the spool or quill to be released when any desired amount is wound upon it.

The mechanism for winding the cotton, silk, or other material upon the spool or quill is such as is now in use.

My invention is illustrated in the accompanying drawings in connection with one character of mechanism, in which—

Figure 1 represents a front view of my improved machine, showing the operation of winding, one spool only being shown and said spool being empty. Fig. 2 represents an end view of Fig. 1, the dotted lines showing the spool, after the operation of winding, on the point of being released and after such release. Fig. 3 represents a rear view of a portion of Fig. 1, showing that part of the machine which directly relates to my improvement.

Similar letters denote similar parts in all the drawings.

A is a shaft, upon which are one or more wheels, B, having the friction-surface $b$, (one wheel being shown in the drawings, there being in the practical use of the machine wheels in number dependent upon the extent of the shaft and equal in number to spools or quills to be wound.) A spool or quill, C, rests upon this wheel. This spool or quill is held in position by the rod $c$, one end of which is secured to an arm, $d$, of the frame D and passes through the center of the spool or quill C, and the other end of the rod $c$ is held by the spring-catch $d'$, secured to the other arm, $d^2$, of the frame D. An arm, E, is either cast with or secured to the frame D. This arm E is pivotally connected to the brackets $e\ e'$; these brackets being secured to the rear frame, F, of the machine. A rod, G, threaded at the top, is pivoted to these brackets at $g$, and is held normally in the position shown in Fig. 2 by the spring $g'$. On this rod G is an internally-threaded cap, H, in section the shape of a frustum of a cone, and having the threaded jam-nut $h$ over it. The inner end of the arm E rests upon the outer surface of this cap H. At or near one end of this shaft A is the worm-gearing $x$, which operates the shaft $y$, to which shaft is secured the double cam K. The turning of the shaft $y$ revolves the double cam K. A lug, $k$, a part of the link L, rests against this cam. This link L is secured in the slotted projection $l$, secured to a rod, $l'$, a part of the main frame of the machine. This lug $k$ is held against the cam-surface by the spring $l^2$. The link L is connected by the connection-rod $m$ (pivotally connected at $m'\ m^2$) to the link M, secured to the frame N, held in slotted guides $n\ n$ in the main frame of the machine. This frame N carries the guides O O'.

The operation is as follows: The spool or quill is secured in position by the rod $c$, as hereinbefore described, and the thread, silk, or other material coming from the source of supply is passed around the guides O O' and connected to the spool C. (Any suitable guides may be used in place of those shown in the drawings.) The arm E, resting on the cap H, holds the spool against the friction-surface $b$ of the wheel B. Upon the crank I being operated the wheel B revolves, revolving the spool, and the double cam $y$, also revolving, through the links L and M, causes the frame N to travel across the machine and return back to its original position. This last causes the thread or other material to be carried forward and backward across the spool, and this, with the revolution of the wheel, causes the thread to be properly wound upon the spool or quill. As the operation continues, the thread upon the spool or quill becomes greater in diameter by filling up, which causes the arm E to gradually force the rod G backward and the arm E takes a position nearer the base of the cap H. When the amount of thread or other material becomes sufficient, it will cause the arm E to drop a distance, which will force the rod G to assume the position shown in dotted lines, Fig. 2, at which point the arm E will drop off the cap H, and, thus being released from the pressure produced by the spring-actuated rod G, the weight of the arm E beyond its point of pivoting causes the spool or quill C to rise off the friction-surface b of the wheel B, assuming the position shown in upper dotted lines, Fig. 2, and further winding ceases. The spring g causes the rod G thus released to return to the position shown in solid lines, Fig. 2. The cap H is internally threaded, and said threaded portion surrounds the rod G, and the upper portion of the rod is also threaded. The cap H may be set at various positions in the rod, causing the arm E to be released and the spool or quill elevated from the wheel when different amounts of material are upon the spool or quill, and the machine may thus be made adjustable for any desired amount of material. The mechanism for winding forms no part of my invention, and any mechanism for accomplishing that result may be used with my invention.

Having now fully described my invention, what I claim, and desire to protect by Letters Patent, is—

1. In a spool or quill winding machine, in combination, a wheel having a friction-surface, a frame adapted to receive a spool or quill, a pivoted arm cast with or secured to said frame, a spring-actuated pivoted rod, and an adjustable tapering cap upon said rod, and against the surface of which cap the inner end of the pivoted arm rests when the material is being wound upon the spool or quill, substantially as and for the purpose specified.

2. In a spool or quill winding machine, in combination, a wheel having a friction-surface, a frame adapted to receive a spool or quill, a pivoted arm cast with or secured to said frame, a pivoted spring actuated rod threaded at its upper end, and a tapering cap internally threaded and surrounding said rod, and against the surface of which cap the inner end of the arm rests when the material is being wound on the spool or quill, substantially as and for the purpose specified.

3. In a spool or quill winding machine, in combination, a wheel having a friction-surface, a frame adapted to receive a spool or quill, a pivoted arm cast with or secured to said frame, a pivoted spring-actuated rod threaded at its upper end, a tapering cap internally threaded and surrounding said rod, and against the surface of which cap the inner end of the pivoted arm rests when the material is being wound on the spool or quill, and a nut or washer on said rod above said cap, substantially as and for the purpose specified.

ALFRED INSINGER.

Witnesses:
BUTLER KENNER HARDING,
HOWARD QUICK.